US011999220B2

(12) United States Patent
Boessler et al.

(10) Patent No.: US 11,999,220 B2
(45) Date of Patent: *Jun. 4, 2024

(54) AWNING CONNECTOR ASSEMBLY

(71) Applicant: Lippert Components, Inc., Elkhart, IN (US)

(72) Inventors: Mark Boessler, Elkhart, IN (US); Catherine Kline, Bronson, MI (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/895,348

(22) Filed: Aug. 25, 2022

(65) Prior Publication Data
US 2022/0410670 A1    Dec. 29, 2022

Related U.S. Application Data

(63) Continuation of application No. 16/674,227, filed on Nov. 5, 2019, now Pat. No. 11,458,820.

(60) Provisional application No. 62/755,616, filed on Nov. 5, 2018.

(51) Int. Cl.
| | | |
|---|---|---|
| *B60J 3/00* | (2006.01) | |
| *B60P 3/34* | (2006.01) | |
| *E04F 10/06* | (2006.01) | |

(52) U.S. Cl.
CPC .............. *B60J 3/002* (2013.01); *B60P 3/341* (2013.01); *B60P 3/343* (2013.01); *E04F 10/0662* (2013.01)

(58) Field of Classification Search
CPC . B60J 3/002; B60P 3/343; B60P 3/341; B60P 3/34; E04F 10/06; E04F 10/0633; E04F 10/0662
USPC ..................... 296/171, 175, 165, 26.13, 163; 160/368.1
See application file for complete search history.

(56) References Cited

U.S. PATENT DOCUMENTS

| | | | | | |
|---|---|---|---|---|---|
| 1,357,048 | A | * | 10/1920 | Harnly ................ | E04F 10/0651 160/82 |
| 1,377,784 | A | * | 5/1921 | Nodland ............. | E04F 10/0677 242/615 |
| 1,742,437 | A | | 1/1930 | Davenport | |
| 2,890,853 | A | * | 6/1959 | D Azzo .................... | E04F 10/02 248/273 |
| 3,128,851 | A | * | 4/1964 | Deridder ................... | E04C 2/08 52/630 |
| 3,464,480 | A | * | 9/1969 | Kuss ...................... | A47H 13/01 160/370 |
| 3,720,438 | A | * | 3/1973 | Johnson ................... | E04H 15/08 160/46 |
| 3,826,271 | A | * | 7/1974 | Sattler ..................... | B60P 3/343 135/904 |
| 3,845,927 | A | * | 11/1974 | Bratschi ................... | A47H 1/14 248/223.41 |

(Continued)

*Primary Examiner* — Jason S Daniels
(74) *Attorney, Agent, or Firm* — NIXON & VANDERHYE P.C.

(57) ABSTRACT

An awning connector assembly includes a mounting bracket having first and second elongated and parallel beads, and an extension bracket defining first and second elongated and parallel grooves configured to slidingly receive the first and second beads in laterally locked engagement. The mounting bracket can be secured to a slide-out room by the vehicle manufacturer to facilitate after-purchase installation of an awning assembly if desired by the vehicle owner.

11 Claims, 5 Drawing Sheets

(56) References Cited

U.S. PATENT DOCUMENTS

| | | | | |
|---|---|---|---|---|
| 3,949,960 A * | 4/1976 | McKee | ............... | E04F 10/0685 |
| | | | | 248/220.21 |
| 4,634,172 A * | 1/1987 | Duda | ................. | E04F 10/0685 |
| | | | | 135/88.12 |
| 5,752,536 A | 5/1998 | Becker | | |
| 5,752,556 A | 5/1998 | Steadman | | |
| 6,279,641 B1 * | 8/2001 | Malott | .................... | E04F 10/08 |
| | | | | 160/67 |
| 6,695,388 B1 | 2/2004 | Thisdale | | |
| 6,729,679 B1 | 5/2004 | Malott | | |
| 6,840,568 B2 | 1/2005 | Carrillo et al. | | |
| 6,860,544 B2 | 3/2005 | Malott | | |
| 6,874,559 B1 | 4/2005 | Hicks | | |
| 7,077,458 B2 | 7/2006 | Malott et al. | | |
| 7,121,314 B2 * | 10/2006 | Hicks | ................. | E04F 10/0651 |
| | | | | 160/67 |
| 7,513,289 B2 | 4/2009 | Weddell | | |
| 8,141,613 B2 | 3/2012 | Brutsaert | | |
| 8,752,606 B2 | 6/2014 | Albrecht et al. | | |
| 8,950,460 B2 | 2/2015 | Worthman et al. | | |
| 9,175,481 B2 | 11/2015 | Albrecht et al. | | |
| 9,410,326 B2 | 8/2016 | Albrecht et al. | | |
| 9,637,943 B2 | 5/2017 | Fiwek et al. | | |
| 9,834,952 B1 * | 12/2017 | Meyers | ............... | E04F 10/0614 |
| 2017/0264224 A1 * | 9/2017 | Becker | ................. | E04F 10/0614 |

\* cited by examiner

AWNING CONNECTOR ASSEMBLY

CROSS-REFERENCES TO RELATED APPLICATIONS

This application is a continuation of U.S. patent application Ser. No. 16/674,227, filed Nov. 5, 2019, pending, which claims the benefit of U.S. Provisional Patent Application No. 62/755,616, filed Nov. 5, 2018, the entire contents of each of which are hereby incorporated by reference in this application.

STATEMENT REGARDING FEDERALLY SPONSORED RESEARCH OR DEVELOPMENT (NOT APPLICABLE)

BACKGROUND

It is known to provide a recreational vehicle (RV) or other vehicle with a slide-out room that may be extended from and retracted into the vehicle through an opening in a wall of the vehicle to thereby selectively increase and decrease the interior volume of the vehicle. A known problem with such a slide-out room is that water and debris may collect on the roof of the slide-out room while the room is extended from the vehicle. The water or debris, or a portion thereof, may be drawn in the vehicle when the room is retracted into the vehicle.

Efforts have been made to mitigate this problem. For example, it is known to provide a vehicle with an awning system that may cover the roof of the slide-out room from the outer wall of the vehicle to the outer wall of the slide-out room when the slide-out room is extended.

Such an awning system adds cost to the vehicle. As such, it might be offered as an optional feature, rather than a standard feature, so that a vehicle buyer may forego the awning system in order to reduce the purchase price of the vehicle.

Should a vehicle buyer forgo the awning system at the time of purchase and later desire to install it, certain bracketry typically would need to be installed to the slide-out room in order to attach the awning. Installation of the bracket may require drilling mounting holes into the slide-out room, thereby compromising the environmental integrity of the room. Although the holes could be sealed to restore the environmental integrity, it may be possible to better do so during manufacture of the vehicle, rather than after the fact.

SUMMARY

The present disclosure is directed to a multi-piece bracket system having one piece that may be attached to a slide-out room, for example, during the manufacture thereof, and another piece that may be later integrated with the one piece and to an awning to thereby attach the awning to the slide-out room.

In an exemplary embodiment, an awning connector assembly for securing an awning assembly above a slide-out room includes a mounting bracket securable to an outer wall of the slide-out room, and an extension bracket selectively attachable to the mounting bracket. The mounting bracket includes a first elongated bead and a second elongated bead, parallel to and spaced from the first elongated bead. The extension bracket includes a first elongated groove configured to receive the first elongated bead in lateral sliding engagement and a second elongated groove configured to receive the second elongated bead in lateral sliding engagement. A bar receiving extension of the extension bracket is configured to receive a bar of the awning assembly.

The first and second elongated grooves may include bevels at respective openings thereof. The mounting bracket may further include a locating tab that is engageable with a molding of the slide-out room. The extension bracket may include a third elongated groove configured to receive the first elongated bead in lateral sliding engagement and a fourth elongated groove configured to receive the second elongated bead in lateral sliding engagement, where the third and fourth elongated grooves define an alternative engagement for the first and second elongated beads of the mounting bracket. The bar receiving section may include a non-circular cross-section corresponding to a shape of the bar.

The extension bracket may include a bead receiving section including the first and second elongated grooves and a connecting arm extending between the bead receiving section and the bar receiving extension. The connecting arm may extend upward and away from the mounting bracket.

A connector may be configured to secure the extension bracket relative to the mounting bracket.

In another exemplary embodiment, an awning connector assembly for securing an awning assembly above a slide-out room includes the mounting bracket and the extension bracket. The mounting bracket includes a mounting base, a first arm extending from the mounting base and terminating in a first elongated bead, and a second arm extending from the mounting base terminating in a second elongated bead, parallel to and spaced from the first elongated bead. The extension bracket includes a first elongated groove and a third elongated groove configured to receive the first elongated bead in lateral sliding engagement and a second elongated groove and a fourth elongated groove configured to receive the second elongated bead in lateral sliding engagement. The third and fourth elongated grooves define an alternative engaging position for the extension bracket relative to the mounting bracket. A bar receiving extension of the extension bracket is configured to receive a bar of the awning assembly.

The first arm may extend downward and outward from the mounting base, and the second arm may extend upward and outward from the mounting base. The first arm may extend at a downward angle of about 45 degrees relative to the mounting base, and the second arm may extend at an upward angle of about 45 degrees relative to the mounting base.

In yet another exemplary embodiment, a connector assembly includes an elongated mounting bracket and an extension bracket. The mounting bracket includes an elongated, generally planar mounting base, an elongated first arm extending from a first side of the mounting base, wherein the first arm terminates in a first elongated bead, and an elongated second arm extending from the first side of the mounting base, where the second arm terminates in a second elongated bead spaced from and parallel to the first bead. The extension bracket includes a bead receiving portion defining a first groove and a second groove, where the first groove is configured to slidingly receive the first bead in laterally locked engagement, and where the second groove is configured to slidingly receive the second bead in laterally locked engagement, and a bar receiving portion configured to receive a bar in keyed engagement.

An awning system may include the connector assembly of the described embodiments and an awning assembly, where the awning assembly includes an awning assembly bracket configured to receive the bar in keyed engagement.

BRIEF DESCRIPTION OF THE DRAWINGS

These and other aspects and advantages will be described in detail with reference to the accompanying drawings, in which.

DETAILED DESCRIPTION

The drawings show an illustrative embodiment of first and second awning connector assemblies 10 configured to connect an awning system 12 to a slide-out room 14 of a vehicle 16.

Figure 1:
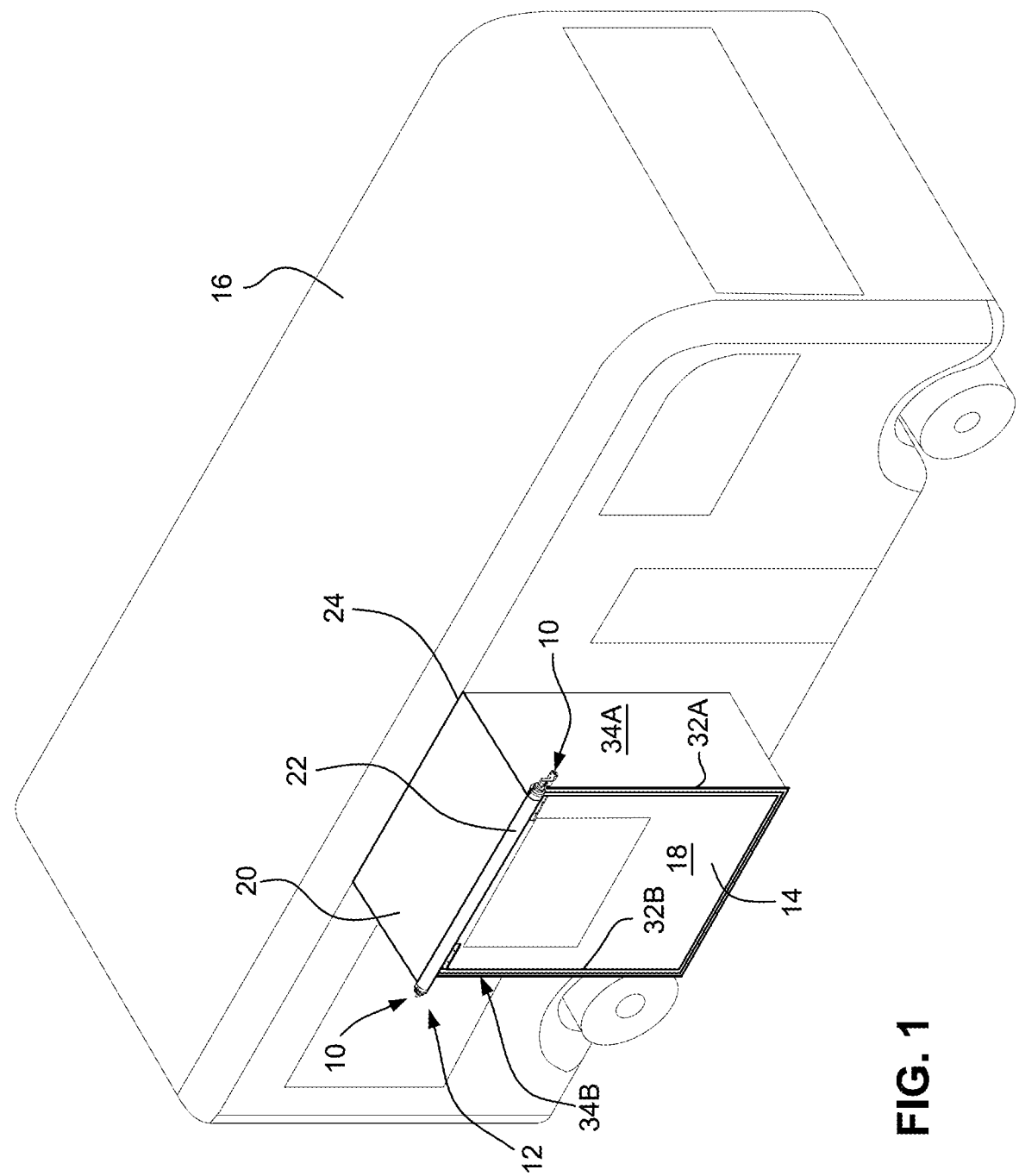
FIG. 1 is a perspective view of a vehicle having an awning system connected to a slide-out room thereof by an awning connector assembly according to the present disclosure.

FIG. 1 shows the vehicle 16 with the slide-out room 14 extended therefrom. FIG. 1 also shows the awning system 12 connected to an upper portion of an outer wall 18 of the slide-out room 14 through the first and second connector assemblies 10, with a canopy 20 of the awning system in a deployed configuration. As shown, the canopy 20 extends from an awning roller 22 of the awning system to a header 24 installed on the wall of the vehicle 16.

Figure 2:
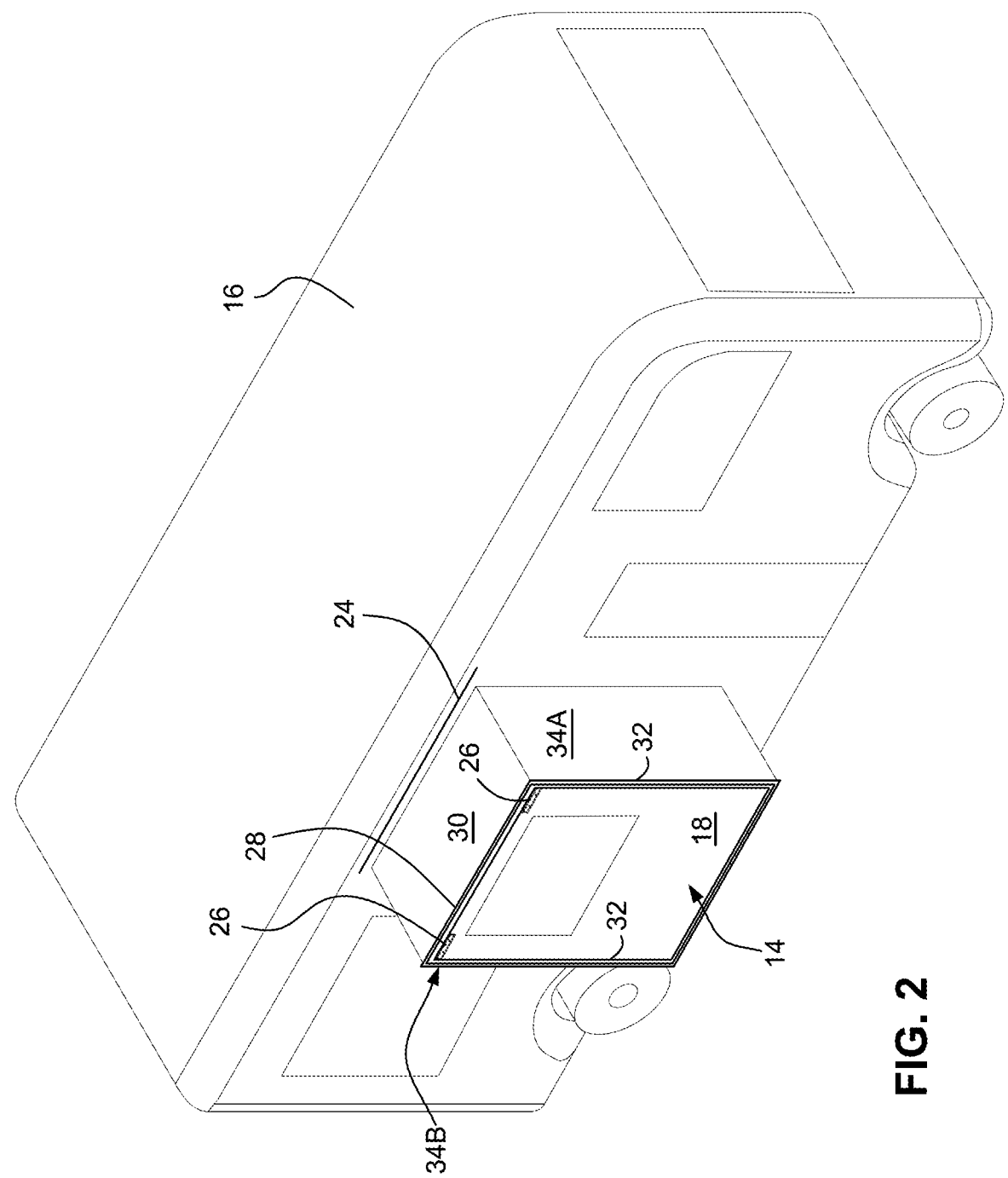
FIG. 2 is a perspective view of the vehicle of FIG. 1 having a mounting bracket of the awning connector assembly of FIG. 1 connected to the slide-out room of FIG. 1 and with other portions of the awning system omitted for clarity.
Figure 3:
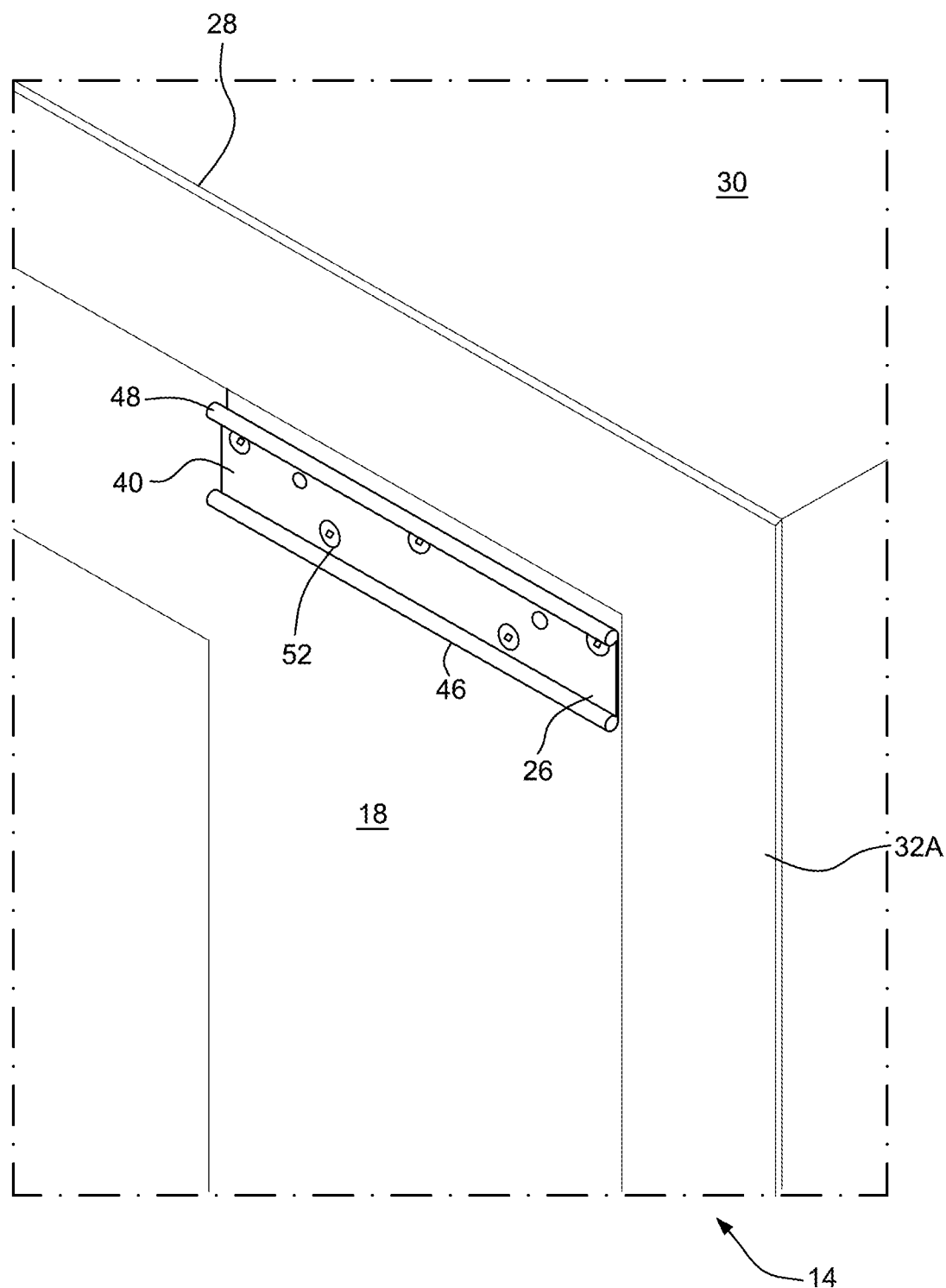
FIG. 3 is a detail perspective view of the vehicle of FIG. 1 having the mounting bracket of the awning connector assembly of FIG. 1 connected to the slide-out room of FIG. 1.
Figure 4:
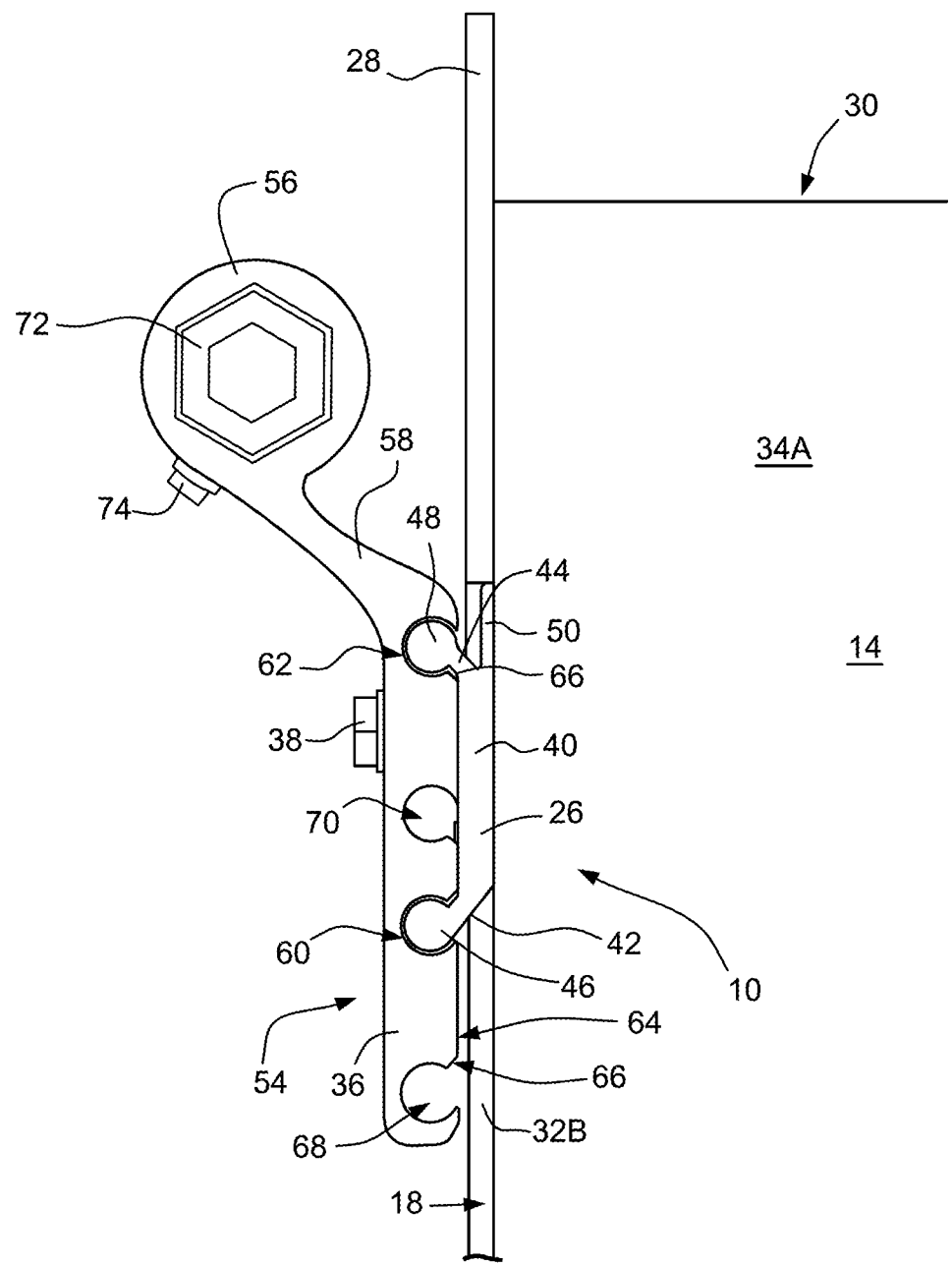
FIG. 4 is an end view of the awning connector assembly of FIG. 1 connected to the slide-out room of FIG. 1.

FIG. 2 similarly shows the vehicle 16 with the slide-out room 14 extended therefrom. FIG. 2 also shows elongated mounting brackets 26 of the first and second connector assemblies 10 connected, respectively, to an upper rear portion of the outer wall 18 of the slide-out room 14 and an upper forward portion of the outer wall 18 of the slide-out room 14. FIG. 2 further shows an elongated trim piece or molding 28 attached to the upper portion of the slide-out room 14 proximate to or abutting a roof 30 of the slide-out room 14. As shown in FIGS. 3 and 4, similar moldings 32A, 32B may be attached to the side portions of the slide-out room 14 proximate to or abutting respective forward and rear sidewalls 34A, 34B of the slide-out room 14.

FIG. 3 is a detail view of the upper forward portion of the slide-out room 14 showing the mounting bracket 26 connected to the outer wall 18 of the slide-out room 14 proximate the upper forward corner thereof. More specifically, FIG. 3 shows the upper molding 28 and the forward side molding 32A attached to the outer wall 18 of the slide-out room 14, and the mounting bracket 26 abutting inner edges of both the upper molding 28 and the forward side molding 32A.

FIG. 4 is a side elevation detail view of the upper forward portion of the slide-out room 14 showing the connector assembly 10, including the elongated mounting bracket 26, a similarly elongated extension bracket 36, and a set screw 38, connected to the outer wall 18 of the slide-out room 14 proximate the upper forward corner thereof. The forward side molding 32A is omitted from FIG. 4 for clarity.

As best shown in FIGS. 3 and 4, the mounting bracket 26 includes a generally planar and elongated mounting base 40, a first or lower elongated arm 42 extending from a first or lower portion of the mounting base 40, and a second or upper elongated arm 44 extending from a second or upper portion of the mounting base 40. The free end of the first arm 42 terminates in a first bead 46 spaced from the mounting base 40, and the free end of the second arm 44 terminates in a second bead 48 spaced from the mounting base 40, and spaced from and parallel to the first bead 46.

In some embodiments, the first arm 42 extends downwardly and outwardly from the mounting base 40 at a first acute angle, and the second arm 44 extends upwardly and outwardly from the mounting base 40 at a second acute angle. Both the first and second angles may be about 45 degrees. In other embodiments, the first and second angles could be selected as desired, and they may be, but need not be, the same. The first and second arms 42, 44 extend from the same side of the mounting base 40 in generally opposite directions, that is, outwardly from the mounting base 40 and with the free ends thereof directed away from each other. Alternatively, the first and second arms 42, 44 could extend from the same side of the mounting base 40 with the free ends thereof directed toward each other.

A locating tab 50 extends from the mounting base 40, generally coplanar therewith, proximate the line from which the second arm 44 extends from the mounting base 40. As shown in FIG. 4, the locating tab 50 is configured for abutment with an interior edge of the upper molding 28. As shown in FIG. 3, the mounting base 40 defines a plurality of apertures (obscured by screws 52) that may receive mechanical fasteners (e.g., screws 52) for attaching the mounting bracket 26 to the slide-out room 14.

Figure 5:
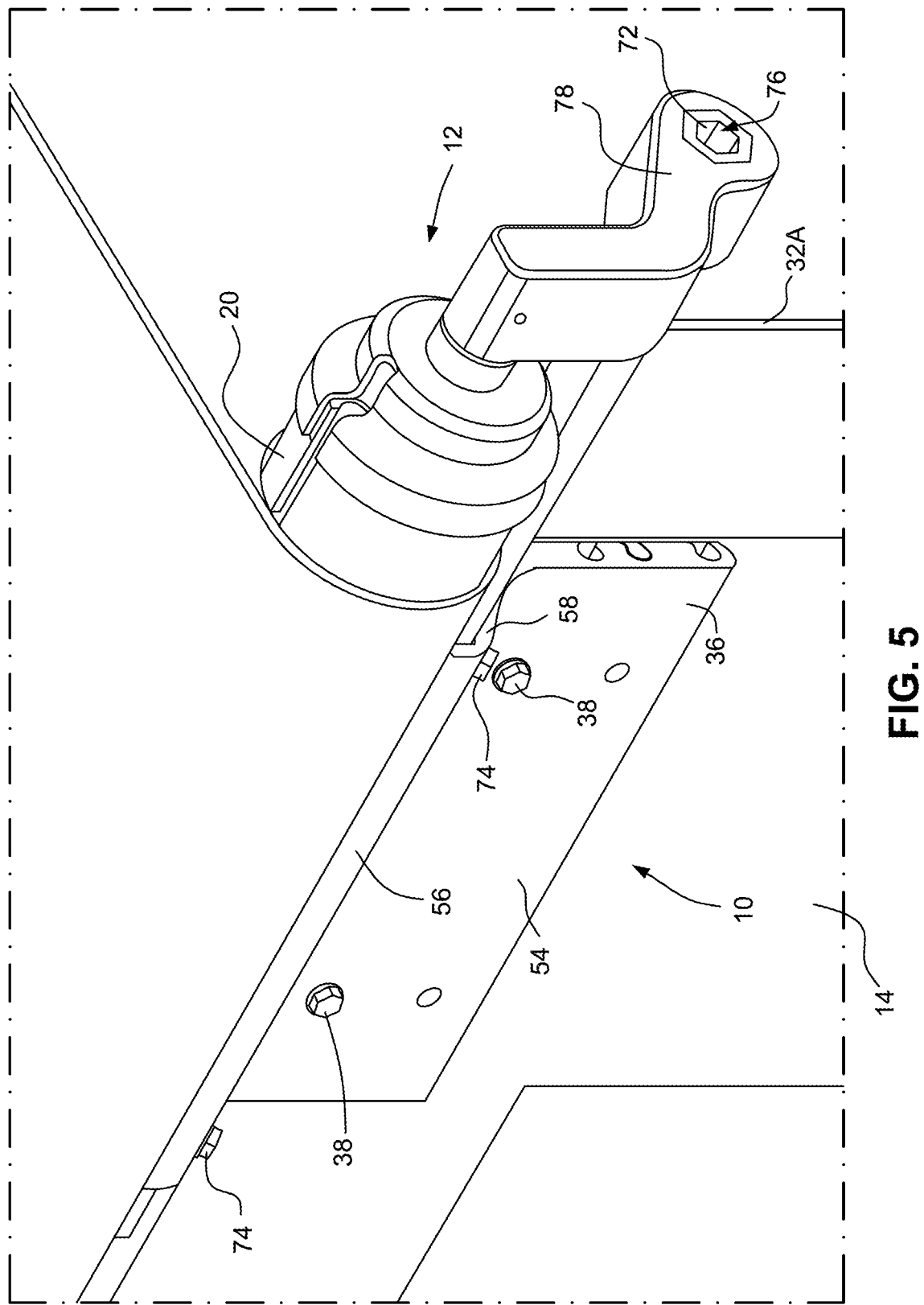
FIG. 5 is a detail perspective view of the awning system of FIG. 1 connected to the slide-out room of FIG. 1 by the awning connector assembly of FIG. 1.

As best shown in FIGS. 4 and 5, the extension bracket 36 includes a bead receiving portion 54 and a bar receiving portion/extension 56 connected to the bead receiving portion 54 through an intervening connecting portion/arm 58.

The bead receiving portion 54 is generally planar and defines first and second elongated grooves 60, 62 configured to receive the first and second beads 46, 48, respectively, in sliding engagement in a first relationship. More specifically, the grooves 60, 62 are configured to receive through respective ends thereof corresponding ends of the first and second beads 46, 48 in sliding engagement. As such, the first and second grooves 60, 62 are parallel to each other and spaced from each other by the same distance by which the first and second beads 46, 48 are spaced from each other. The beads 46, 48 and grooves 60, 62 are further configured so that the beads 46, 48 may be inserted into and removed from the grooves 60, 62 only by such sliding, and so that that the beads 46, 48 are laterally locked into the grooves 60, 62, that is, locked into the grooves 60, 62 in all directions except the axial (sliding) direction.

As best shown in FIG. 4, a surface 64 of the bead receiving portion 54 of the extension bracket 36 is configured to abut or be placed adjacent a corresponding surface of the mounting base 40 of the mounting bracket 26 when the beads 46, 48 are received within the grooves 60, 62. Portions of the surface 64 adjacent the grooves 60, 62 may define bevels 66 at openings of the grooves 60, 62 to facilitate receipt of the beads 46, 48 and adjacent portions of the corresponding arms 42, 44 into the grooves 60, 62.

The bead receiving portion 54 further defines third and fourth grooves 68, 70 configured to receive the first and second beads 46, 48 in sliding engagement in a second relationship. The third and fourth grooves 68, 70 are configured in the same manner as the first and second grooves 60, 62. The third and fourth grooves 68, 70 may be spaced from the first and second grooves 60, 62 by any desired distance, for example, about ¾ inch or any greater or lesser distance.

The bar receiving portion 56 is configured to receive an elongated bar 72 in sliding and keyed engagement. As shown, the bar 72 may have a hexagonal cross section. In other embodiments, the bar 72 may have other cross sections. The bar receiving portion 56 may be provided with set screws 74 for fixing the bar 72 with respect thereto. The connecting portion 58 may extend from the bead receiving portion 54 at an angle of about 45 degrees to the plane of the bead receiving portion 54. This angle and the length of the connecting portion 58 may be selected as desired to position the bar receiving portion 56 in any desired positon with respect to the bead receiving portion 54. In an embodiment, the bar receiving portion 56 could extend directly from the bead receiving portion 54, and the connecting portion 58 could effectively be omitted.

As shown in FIG. 5, the bar 72 also may be configured to be received within an aperture 76 defined by a corresponding bracket 78 of the awning assembly 12.

Any or all of the mounting bracket 26, the extension bracket 36, and the bar 72 may be manufactured as extrusions.

In use, first and second mounting brackets 26 may be attached to the outer wall of the slide-out room 14 proximate upper forward and upper rearward corners thereof, for example, using screws 52. If the slide-out room 14 is fitted with the upper molding 28, the optional locating tab 50 may be butted up against the inner edge of the upper molding 28 to facilitate vertical alignment of the mounting bracket 26 with the slide-out room 14. If the slide-out room 14 is fitted with the side moldings 32A, 32B, the respective ends of the first and second mounting brackets 26 may be butted up against the inner edges of the respective side moldings 32A, 23B to facilitate horizontal alignment of the mounting bracket 26 with the slide-out room 14.

The foregoing assembly of the mounting brackets 26 to the slide-out room 14 may occur during the manufacture of the slide-out room 14 or vehicle 16 or at any other time.

The first and second extension brackets 36 may be assembled, respectively, to the first and second mounting brackets 26 by receiving the first and second beads 46, 48 of the mounting brackets 26, respectively, within the first and second grooves 60, 62 (or the third and fourth grooves 68, 70) of the extension brackets 36. The set screws 38 serve to secure the extension brackets 36 to the mounting brackets 26.

The bar 72 may be slidingly received within the bar receiving portion 56 of the extension bracket 36. The awning assembly 12 may be connected to the connector assembly 10 by aligning the aperture 76 defined by the awning assembly brackets 78 with the bar 72, and sliding the bar 72 into the aperture 76 so that the bar 72 is simultaneously received by the aperture 76 and the bar receiving portion 56 of the extension bracket 36. The set screws 74 serve to secure the bars 72 to the extension brackets 36.

Terms of orientation, for example, upper, lower, forward, rearward, inner, outer, and the like, as may be used herein should be construed in a relative, rather than absolute, sense, unless context clearly dictates otherwise.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An awning connector assembly for securing an awning assembly above a slide-out room, the awning connector assembly comprising:
    a mounting bracket securable to an outer wall of the slide-out room, the mounting bracket having a planar mounting base and an elongated arm extending from the planar mounting base and including at least one elongated bead at a distal end thereof, wherein facing away from the slide-out room outer wall, the mounting bracket defines an overall concave configuration via the planar mounting base and the elongated arm; and
    an extension bracket selectively attachable to the mounting bracket, the extension bracket including a corresponding at least one elongated groove configured to receive the at least one elongated bead in lateral sliding engagement,
    wherein the extension bracket comprises a bead receiving section including the at least one elongated groove and a connecting arm extending from the bead receiving section, wherein the connecting arm extends upward and away from the mounting bracket relative to the slide-out room outer wall, and wherein the connecting arm is configured to support the awning assembly.

2. The awning connector assembly according to claim 1, wherein the mounting bracket further comprises a locating tab that is engageable with a molding of the slide-out room.

3. The awning connector assembly according to claim 1, wherein the extension bracket comprises at least two elongated grooves configured to receive the at least one elongated bead in lateral sliding engagement, the at least two elongated grooves defining alternative engagements for the at least one elongated bead of the mounting bracket.

4. The awning connector assembly according to claim 1, further comprising a connector configured to secure the extension bracket relative to the mounting bracket.

5. The awning connector assembly according to claim 1, wherein the extension bracket comprises a bar receiving extension that is configured to receive a bar of the awning assembly.

6. The awning connector assembly according to claim 5, wherein the bar receiving extension comprises a non-circular cross-section corresponding to a shape of the bar.

7. The awning connector assembly according to claim 1, wherein the mounting bracket and the extension bracket comprise extruded material.

8. A mounting bracket comprising:
    an elongated, generally planar mounting base securable to an outer wall of an extending and retracting slide-out room,
    an elongated first arm extending from a first side of the mounting base, the first arm terminating in a first elongated bead, and
    an elongated second arm extending from said first side of said mounting base, the second arm terminating in a second elongated bead spaced from and parallel to the first elongated bead.

9. The mounting bracket according to claim 8, further comprising a locating tab that is engageable with a slide-out room molding.

10. The mounting bracket according to claim 9, wherein the locating tab is generally coplanar with the mounting base.

11. The mounting bracket according to claim 8, formed via extrusion.

\* \* \* \* \*